2 Sheets--Sheet 1.

J. W. MILROY.

Rotary Cultivators.

No. 135,002. Patented Jan. 21, 1873.

Witnesses
John A. Ellis
Wm. T. Geeis

Inventor
James W. Milroy
Per
J. H. Alexander & Co.
Attys.

2 Sheets--Sheet 2.

J. W. MILROY.

Rotary Cultivators.

No. 135,002. Patented Jan. 21, 1873.

UNITED STATES PATENT OFFICE.

JAMES W. MILROY, OF HAYWOOD, CALIFORNIA, ASSIGNOR TO HIMSELF, WM. R. MICHENER, AND C. L. HOWARD, OF SAME PLACE.

IMPROVEMENT IN ROTARY CULTIVATORS.

Specification forming part of Letters Patent No. 135,002, dated January 21, 1873.

*To all whom it may concern:*

Be it known that I, JAMES W. MILROY, of Haywood, in the county of Alameda and State of California, have invented certain new and useful Improvements in Revolving Spade-Plows; and I do hereby declare that the following is a full, clear, and exact description thereof, reference being had to the accompanying drawing and to the letters of reference marked thereon which form a part of this specification.

The nature of my invention consists in the construction and arrangement of a revolving spade-plow with seeder attachment, as will be hereinafter more fully set forth.

In order to enable others skilled in the art to which my invention appertains to make and use the same, I will now proceed to describe its construction and operation, referring to the annexed drawing, in which—

Figure 1:
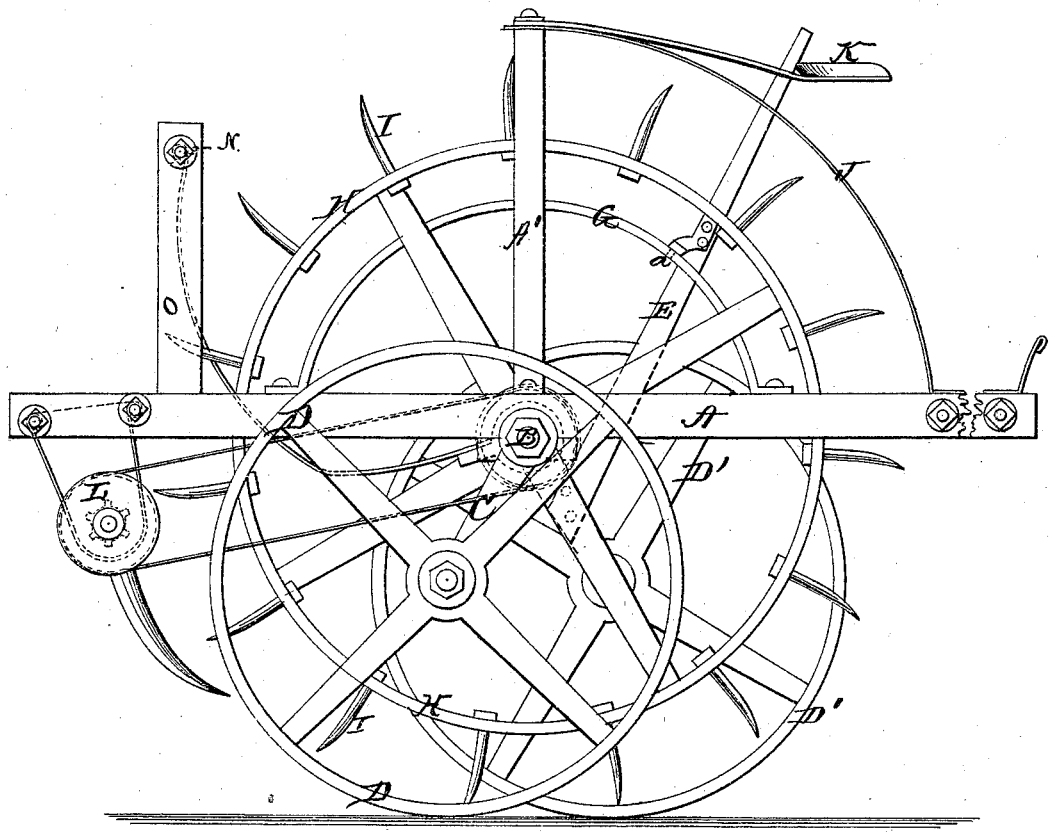
Figure 2:
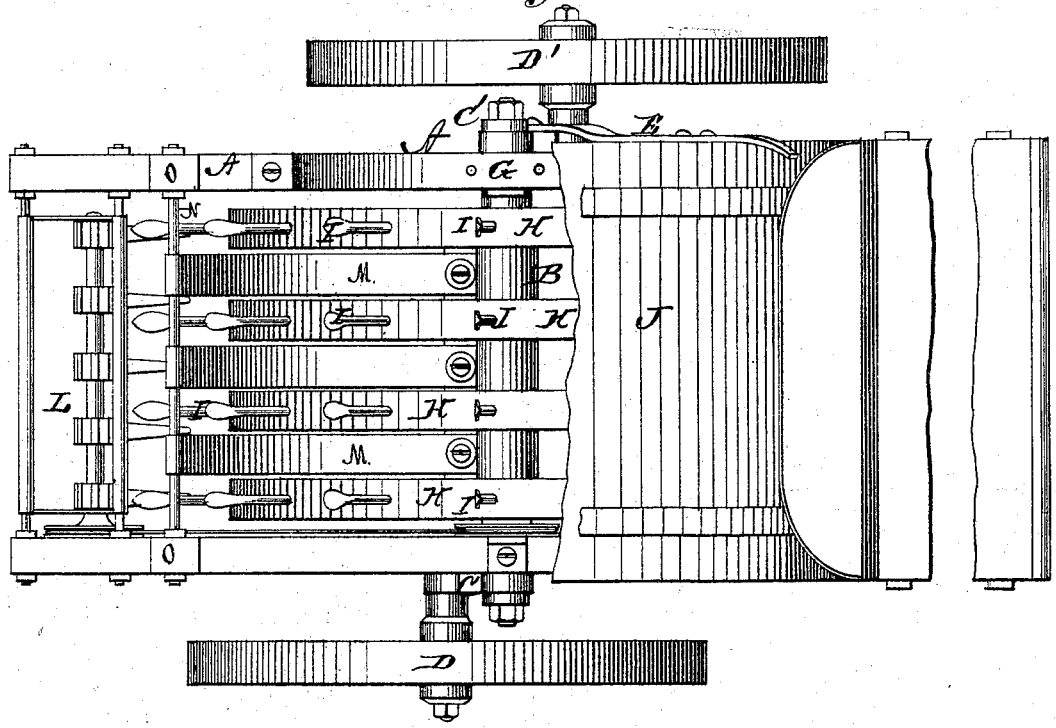

Figure 1 is a side elevation, and Fig. 2 a plan view of my machine.

A represents a rectangular frame of suitable dimensions resting upon an axle, B, which has its bearings in suitable journal-boxes on the under side of the frame. On one end of this axle is a stationary arm, C, with spindle attachment, on which the wheel D is placed; and on the other end of the axle is an arm, C', with spindle attachment, upon which the wheel D' is placed. This arm is moved so as to adjust the axle B to any height desired by means of a lever, E, which may be held at any angle by means of a spring-pin, *a*, attached to it and entering holes in a semicircular bar, G, attached to the frame A, by which means the depth of the spades is regulated to cut deep or shallow, or raised in going to and from the field. Upon the axle B, within the frame A, is placed a number of wheels, H H, each provided with a series of plows or teeth, I I, radiating from the outside of the rim and secured by nuts on the inner side of the same, as shown in Fig. 1. These wheels revolve independently of each other on the axle, and the points of the plows or teeth being curved backward break and cultivate the ground thoroughly. On the frame A directly over the axle is a vertical frame, A', from the upper end of which a curved shield or guard, J, extends forward and downward to the main frame A over that part of the revolving wheels, so as to protect the driver, whose seat, K, is located above said guard attached to the top of the frame A'. Under the rear end of the frame A is suspended a seeding attachment, L, which may be of any desired construction, and the revolving part of which receives its motion by a belt, *b*, from a pulley on the axle B, and secured to the hub of one of the spade-wheels. M represents curved bars, one end of which is suitably secured to the axle B between each of the spades, and the other end secured to the rod N, which is supported from the frame by the standards O, the object of said bars being to free the spades from large clods, trash, &c., while passing between said bars.

Having thus fully described my invention, what I claim as new, and desire to secure by Letters Patent, is—

The frame A and axle B, wheels D D' and spindles C C', in combination with the independent revolving plows or teeth I I on the axle, and arranged to be raised or lowered by lever E, all substantially as and for the purpose herein specified.

In testimony that I claim the foregoing as my own I affix my signature in presence of two witnesses.

J. W. MILROY.

Witnesses:
C. L. HOWARD,
JOSEPH GRAHAM.